United States Patent
Shih et al.

(10) Patent No.: US 11,445,567 B2
(45) Date of Patent: Sep. 13, 2022

(54) METHOD AND APPARATUS FOR RRC STATE TRANSITION

(71) Applicant: FG Innovation Company Limited, Tuen Mun (HK)

(72) Inventors: Mei-Ju Shih, Hsinchu (TW); Yung-Lan Tseng, Hsinchu (TW); Hung-Chen Chen, Hsinchu (TW); Chie-Ming Chou, Hsinchu (TW)

(73) Assignee: FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/537,414

(22) Filed: Aug. 9, 2019

(65) Prior Publication Data

US 2020/0053821 A1   Feb. 13, 2020

Related U.S. Application Data

(60) Provisional application No. 62/717,747, filed on Aug. 10, 2018.

(51) Int. Cl.
*H04W 76/27*   (2018.01)
*H04W 48/20*   (2009.01)

(52) U.S. Cl.
CPC .......... *H04W 76/27* (2018.02); *H04W 48/20* (2013.01)

(58) Field of Classification Search
CPC ............. H04W 36/0033; H04W 48/20; H04W 52/0274; H04W 76/19; H04W 76/27
See application file for complete search history.

(56) References Cited

U.S. PATENT DOCUMENTS

| 10,306,470 | B2 * | 5/2019 | Agiwal | H04W 12/122 |
| 10,624,150 | B2 * | 4/2020 | Tseng | H04W 36/305 |
| 10,966,179 | B2 * | 3/2021 | Turtinen | H04W 76/28 |
| 11,102,838 | B2 * | 8/2021 | Tseng | H04W 76/27 |
| 2016/0309379 | A1 * | 10/2016 | Pelletier | H04W 76/12 |
| 2017/0245254 | A1 * | 8/2017 | Kitagawa | H04W 72/042 |
| 2017/0295489 | A1 * | 10/2017 | Agiwal | H04W 12/108 |

(Continued)

FOREIGN PATENT DOCUMENTS

| AU | 2018314879 A1 * | 3/2020 | ............. H04W 8/14 |
| BR | 112020002641 A2 * | 8/2020 | ............ H04W 36/38 |

(Continued)

OTHER PUBLICATIONS

3GPP, 3GPP Technical Specification 36.304, User Equipment (UE) Procedures in Idle Mode, Jun. 2018, 3GPP, Release 15, Version 15.0.0 (Year: 2018).*

(Continued)

*Primary Examiner* — Eric Nowlin
(74) *Attorney, Agent, or Firm* — ScienBiziP, P.C.

(57) ABSTRACT

A user equipment (UE) includes one or more non-transitory computer-readable media having computer-executable instructions embodied thereon and at least one processor coupled to the one or more non-transitory computer-readable media. The at least one processor is configured to execute the computer-executable instructions to: receive, from a cell, a radio access network (RAN) notification area (RNA) configuration, when the UE is in an RRC_INACTIVE state; and discard the RNA configuration and transitioning to an RRC_IDLE state when the UE finds and camps on an acceptable cell.

20 Claims, 6 Drawing Sheets

100

102 — UE is configured with an RNA configuration.

104 — UE finds a suitable cell.

106 — If the suitable cell does not broadcast tracking area code, the UE triggers an RNAU procedure.

(56) References Cited

U.S. PATENT DOCUMENTS

| | | | | |
|---|---|---|---|---|
| 2018/0220486 A1* | 8/2018 | Tseng | | H04W 36/305 |
| 2019/0150221 A1* | 5/2019 | Tseng | | H04W 68/02 |
| | | | | 370/331 |
| 2019/0268963 A1* | 8/2019 | Kim | | H04W 52/0245 |
| 2019/0289570 A1* | 9/2019 | Kim | | H04W 76/10 |
| 2019/0349825 A1* | 11/2019 | Tseng | | H04W 48/20 |
| 2020/0045593 A1* | 2/2020 | Jung | | H04W 36/0058 |
| 2020/0045669 A1* | 2/2020 | Hwang | | H04W 24/08 |
| 2020/0053821 A1* | 2/2020 | Shih | | H04W 48/20 |
| 2020/0068646 A1* | 2/2020 | Kwon | | H04W 36/0033 |
| 2020/0084746 A1* | 3/2020 | Rune | | H04W 68/005 |
| 2020/0120477 A1* | 4/2020 | Mildh | | H04W 8/08 |
| 2020/0178209 A1* | 6/2020 | Jin | | H04W 36/08 |
| 2020/0205124 A1* | 6/2020 | Liu | | H04W 52/0216 |
| 2020/0267632 A1* | 8/2020 | Lindheimer | | H04W 48/16 |
| 2020/0323018 A1* | 10/2020 | Chen | | H04W 76/30 |
| 2020/0351723 A1* | 11/2020 | Kim | | H04W 36/0033 |
| 2021/0022200 A1* | 1/2021 | Mildh | | H04W 76/38 |
| 2021/0037595 A1* | 2/2021 | Jin | | H04W 80/02 |
| 2021/0067945 A1* | 3/2021 | Liu | | H04W 48/20 |
| 2021/0127445 A1* | 4/2021 | da Silva | | H04W 76/30 |
| 2021/0235256 A1* | 7/2021 | Mildh | | H04W 8/08 |
| 2021/0258882 A1* | 8/2021 | Jeong | | H04W 52/02 |
| 2021/0337623 A1* | 10/2021 | Tseng | | H04W 68/02 |

FOREIGN PATENT DOCUMENTS

| | | | | | |
|---|---|---|---|---|---|
| CA | 3072521 | A1 | * | 2/2019 | ............ H04W 60/00 |
| CN | 104754759 | A | | 7/2015 | |
| CN | 108271227 | A | | 7/2018 | |
| CN | 109392035 | A | * | 2/2019 | ............ H04W 36/38 |
| CN | 110381496 | A | * | 10/2019 | .............. H04W 8/14 |
| CN | 110381496 | B | * | 10/2020 | ............ H04W 36/08 |
| CN | 112640529 | A | * | 4/2021 | ............ H04W 48/20 |
| CN | 111316696 | B | * | 2/2022 | ........ H04W 36/0016 |
| EP | 3668203 | A1 | * | 6/2020 | ........ H04W 36/0055 |
| EP | 3668203 | A4 | * | 11/2020 | ........ H04W 36/0055 |
| JP | 2021502785 | A | * | 11/2018 | |
| JP | 6975330 | B2 | * | 12/2021 | ........ H04W 36/0016 |
| KR | 102326913 | B1 | * | 11/2018 | |
| KR | 20200073268 | A | * | 11/2018 | |
| WO | 2018143727 | A1 | | 8/2018 | |
| WO | WO-2019029465 | A1 | * | 2/2019 | ............ H04W 36/38 |
| WO | WO-2020030124 | A1 | * | 2/2020 | ............ H04W 48/20 |

OTHER PUBLICATIONS

3GPP, 3GPP Technical Specification 38.300, NR and NG-RAN Overall Description, Jun. 2018, 3GPP, Release 15, Version 15.2.0 (Year: 2018).*

CATT:"Considerations on acceptable cell with Inactive Mode", 3GPP Draft; R2-1804276 Considerations on Acceptable Cell with Inactive Mode, 3rd Generation Partnership Project (3GPP), Mobile Competence Centre; 650, Route Des Lucioles; F-06921 Sophia-Antipolis CE, vol. RAN WG2, No. Sanya, China, Apr. 6, 2018, XP051415455, *p. 1*.

Qualcomm Incorporated: "Inactive to Idle Transition Scenario", 3GPP Draft R2-1806887_Inactive_Idle_Failure, 3rd Generation Partnership Project (3GPP), Mobile Competence Centre; 650, Route Des Lucioles; F-06921 Sophia-Antipolis Cedex; France, vol. RAN WG2, Busan Korea; May 11, 2018, XP051464459, *p. 1-p. 3*.

Huawei et al: "Priority Scenarios for RRC_Inactive", 3GPP Draft; R3-181360, 3rd Generation Partnership Project (3GPP), Mobile Competence Centre; 650, Route Des Lucioles; F-06921 Sophia-Antipolis Cedex; France, vol. RAN WG3, No. Athens, Greece; Feb. 17, 2018, XP051401795, *p. 3, paragraph 3-p. 4*.

* cited by examiner

METHOD AND APPARATUS FOR RRC STATE TRANSITION

CROSS-REFERENCE TO RELATED APPLICATION(S)

The present application claims the benefit of and priority to a provisional U.S. Patent Application Ser. No. 62/717,747, filed on Aug. 10, 2018, entitled "RRC_INACTIVE Sub-state Transition Mechanism and Related Methods," (hereinafter referred to as "US74730 application"). The disclosure of the US74730 application is hereby incorporated fully by reference into the present application.

FIELD

The present disclosure generally relates to wireless communication, and more particularly, to behavior of a user equipment (UE) in an RRC_INACTIVE state in the next generation wireless communication networks.

BACKGROUND

Various efforts have been made to improve different aspects of wireless communications, such as data rate, latency, reliability and mobility, for the next-generation (e.g., 5G New Radio (NR)) wireless communication systems. For example, the 3rd Generation Partnership Project (3GPP) has introduced a new radio resource control (RRC) state (i.e., the RRC_INACTIVE state) for the next-generation wireless communication networks. For example, in NR, the RRC_INACTIVE state aims to achieve power saving with acceptable access latency. When a User Equipment (UE) is in an RRC_INACTIVE state, the next-generation radio access network (e.g., NG-RAN, 5G RAN, 5G-Access Network (5G-AN)) and the UE may store the Access Stratum (AS) context (e.g., the UE context) separately. In addition, when the UE is in the RRC_INACTIVE state, the UE may not have an RRC connection with the next-generation radio access network, even though the next-generation radio access network may keep a connection with the next-generation core network (e.g., 5GC). A UE in the RRC_INACTIVE state may also be referred to as an RRC_INACTIVE UE in the following description.

A radio access network (RAN)-based notification area (RNA) may allow the next-generation core network and next-generation radio access network to know an approximate location of an RRC_INACTIVE UE. The RNA may include one or more cells, one or more RAN areas, one or more tracking areas, or any combination thereof. The RNA may be UE-specific and configurable by the 5G-AN (e.g., by NG-RAN having one or more next-generation node Bs (gNBs) and/or one or more next-generation evolved node Bs (ng-eNBs)) through dedicated signaling. The next-generation radio access network may be aware of the RRC_INACTIVE UE moving from one RNA to another, and may update the RRC_INACTIVE UE's RNA. It should be noted that the RNA update (RNAU) may be different from a core network level location update or a tracking area update, since the RNA may be smaller than, equal to, or greater than a tracking area.

There is a need in the industry for an improved and efficient state transition mechanism for a UE (e.g., an RRC_INACTIVE UE) in the next-generation wireless networks.

SUMMARY

The present disclosure is directed to behavior of a UE in an RRC_INACTIVE state in the next-generation wireless communication networks.

According to an aspect of the present disclosure, a UE is provided. The UE includes one or more non-transitory computer-readable media having computer-executable instructions embodied thereon and at least one processor coupled to the one or more non-transitory computer-readable media. The at least one processor is configured to execute the computer-executable instructions to: receive, from a cell, a radio access network (RAN) notification area (RNA) configuration, when the UE is in an RRC_INACTIVE state; and discard the RNA configuration and going/transitioning to an RRC_IDLE state when the UE finds and camps on an acceptable cell.

According to another aspect of the present disclosure, a method by a UE is provided. The method includes: receiving an RNA configuration from a cell, when the UE is in an RRC_INACTIVE state; and discarding the RNA configuration and going/transitioning to an RRC_IDLE state when the UE finds and camps on an acceptable cell.

BRIEF DESCRIPTION OF THE DRAWINGS

Aspects of the example disclosure are best understood from the following detailed description when read with the accompanying figures. Various features are not drawn to scale. Dimensions of various features may be arbitrarily increased or reduced for clarity of discussion.

DETAILED DESCRIPTION

Figure 1:
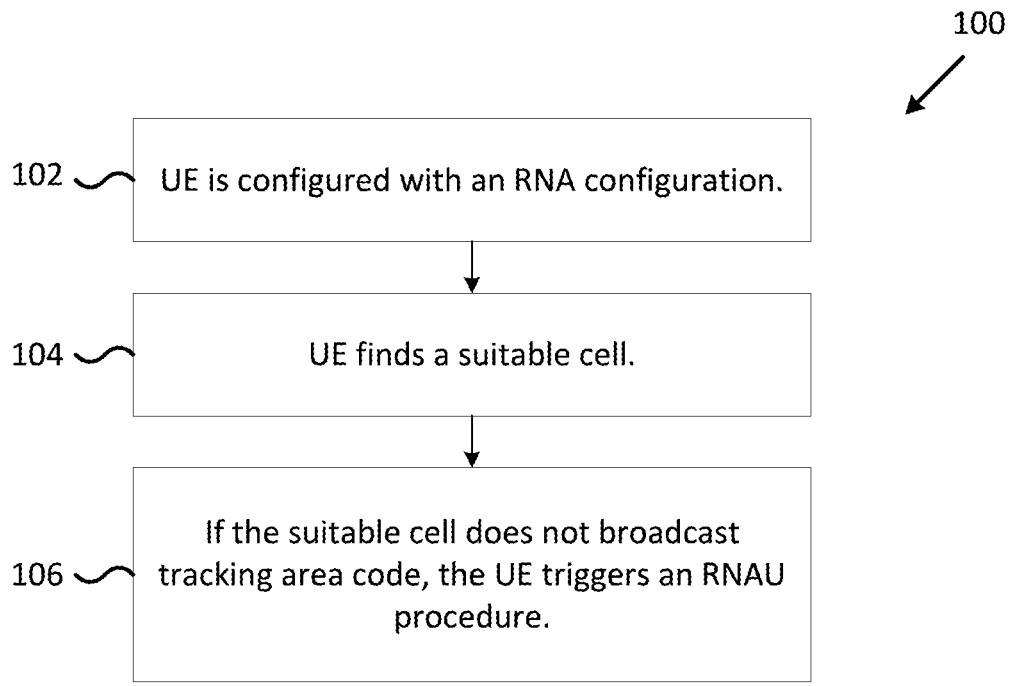
FIG. 1 is a flowchart for a method of triggering an RNAU procedure performed by an RRC_INACTIVE UE, according to an example implementation of the present application.

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

For the purpose of consistency and ease of understanding, like features may be identified (although, in some examples, not shown) by the same numerals in the example figures. However, the features in different implementations may be differed in other respects, and thus shall not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent. The expression "at least one of A, B and C" or "at least one of the following: A, B and C" means "only A, or only B, or only C, or any combination of A, B and C."

Additionally, for the purposes of explanation and non-limitation, specific details, such as functional entities, techniques, protocols, standard, and the like are set forth for providing an understanding of the described technology. In other examples, detailed description of well-known methods, technologies, systems, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules which may be software, hardware, firmware, or any combination thereof. The software implementation may comprise computer-executable instructions stored on computer-readable medium such as memory or other type of storage devices. For example, one or more microprocessors or general-purpose computers with communication processing capability may be programmed with corresponding executable instructions and carry out the described network function(s) or algorithm(s). The microprocessors or general-purpose computers may be formed of Applications Specific Integrated Circuitry (ASIC), programmable logic arrays, and/or using one or more Digital Signal Processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer-readable medium includes but is not limited to Random Access Memory (RAM), Read-Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long-Term Evolution (LTE) system, an LTE-Advanced (LTE-A) system, an LTE-Advanced Pro system, or a 5G NR Radio Access Network (RAN)) typically includes at least one base station, at least one UE, and one or more optional network elements that provide connection towards a network. The UE communicates with the network (e.g., a Core Network (CN), an Evolved Packet Core (EPC) network, an Evolved Universal Terrestrial Radio Access network (E-UTRAN), a 5G Core (5GC), or an internet), through a RAN established by one or more base stations.

It should be noted that, in the present application, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, a vehicle, or a Personal Digital Assistant (PDA) with wireless communication capability. The UE is configured to receive and transmit signals over an air interface to one or more cells in a radio access network.

A base station may be configured to provide communication services according to at least one of the following Radio Access Technologies (RATs): Worldwide Interoperability for Microwave Access (WiMAX), Global System for Mobile communications (GSM, often referred to as 2G), GSM Enhanced Data rates for GSM Evolution (EDGE) Radio Access Network (GERAN), General Packet Radio Service (GPRS), Universal Mobile Telecommunication System (UMTS, often referred to as 3G) based on basic wideband-code division multiple access (W-CDMA), high-speed packet access (HSPA), LTE, LTE-A, eLTE (evolved LTE, e.g., LTE connected to 5GC), NR (often referred to as 5G), and/or LTE-A Pro. However, the scope of the present application should not be limited to the above-mentioned protocols.

A base station may include, but is not limited to, a node B (NB) as in the UMTS, an evolved node B (eNB) as in the LTE or LTE-A, a radio network controller (RNC) as in the UMTS, a base station controller (BSC) as in the GSM/GERAN, a ng-eNB as in an E-UTRA base station in connection with the 5GC, a next-generation Node B (gNB) as in the 5G-RAN, and any other apparatus capable of controlling radio communication and managing radio resources within a cell. The base station may serve one or more UEs through a radio interface.

The base station is operable to provide radio coverage to a specific geographical area using a plurality of cells forming the radio access network. The base station supports the operations of the cells. Each cell is operable to provide services to at least one UE within its radio coverage. More specifically, each cell (often referred to as a serving cell) provides services to serve one or more UEs within its radio coverage (e.g., each cell schedules the downlink and optionally uplink resources to at least one UE within its radio coverage for downlink and optionally uplink packet transmissions). The base station can communicate with one or more UEs in the radio communication system through the plurality of cells. A cell may allocate sidelink (SL) resources for supporting Proximity Service (ProSe) or Vehicle to Everything (V2X) service. Each cell may have overlapped coverage areas with other cells.

As discussed above, the frame structure for NR is to support flexible configurations for accommodating various next-generation (e.g., 5G) communication requirements, such as Enhanced Mobile Broadband (eMBB), Massive Machine Type Communication (mMTC), Ultra-Reliable and Low-Latency Communication (URLLC), while fulfilling high reliability, high data rate and low latency requirements. The Orthogonal Frequency-Division Multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP) may also be used. Additionally, two coding schemes are considered for NR: (1) Low-Density Parity-Check (LDPC) code and (2) Polar Code. The coding scheme adaption may be configured based on the channel conditions and/or the service applications.

Moreover, it is also considered that in a transmission time interval TX of a single NR frame, a downlink (DL) transmission data, a guard period, and an uplink (UL) transmission data should at least be included, where the respective portions of the DL transmission data, the guard period, the UL transmission data should also be configurable, for example, based on the network dynamics of NR. In addition, sidelink resources may also be provided in an NR frame to support ProSe services or V2X services.

In addition, the terms "system" and "network" herein may be used interchangeably. The term "and/or" herein is only an association relationship for describing associated objects, and represents that three relationships may exist. For example, A and/or B may indicate that: A exists alone, A and B exist at the same time, or B exists alone. In addition, the character "/" herein generally represents that the former and latter associated objects are in an "or" relationship.

In one implementation, when a UE enters an RRC_INACTIVE state, an NR next-generation Node B (e.g., gNB) may configure the UE with a RAN-based notification area (RNA) and a periodic RNA update (RNAU) timer (e.g., T380). That is, the UE may receive, from a cell, an RNA configuration and a periodic RNAU timer. The UE may start the periodic RNAU timer when it enters the RRC_INACTIVE state. The RNA configuration may be a list of cell IDs, a list of RAN area IDs, and/or a list of Tracking Area IDs. The RAN area ID may include a Public Land Mobile Network (PLMN) ID, a Tracking Area Code (TAC) and a RAN Area Code (RANAC). When the UE moves out of the RNA or when the periodic RNAU timer expires, the UE may trigger an RNA update (RNAU) procedure. The RRC_INACTIVE UE may store the UE AS context and perform a PLMN selection, a cell (re)selection, and a Discontinuous Reception (DRX) for the RAN paging configured by the NG-RAN.

The terms "suitable cell," "acceptable cell," "RNA suitable cell," and "RNA acceptable cell" will be used in the following description. A "suitable cell" may be a cell on which a UE may camp to obtain normal services. In one implementation, a cell may be considered as "suitable" if the following conditions are fulfilled: the cell selection criteria are fulfilled, the cell is not barred, the cell is part of (or served by) either (a) the selected PLMN or (b) the registered PLMN or (c) a PLMN of the Equivalent PLMN list, and the cell is part of at least one Tracking Area (TA) which is not part of the list of Forbidden Tracking Area, which belongs to a PLMN fulfilling (a), (b), or (c).

An "acceptable cell" may be a cell on which a UE may camp to obtain limited services (e.g., originate emergency calls and receive Earthquake & Tsunami Warning System (ETWS) and Commercial Mobile Alert System (CMAS) notifications). In one implementation, an "acceptable cell" may fulfill the following requirements, which may be the minimum set of requirements to initiate an emergency call and to receive the ETWS and CMAS notification: the cell selection criteria are fulfilled, and the cell is not barred. In one implementation, an acceptable cell may not be part of (or served by) either (a) the selected PLMN or (b) the registered PLMN or (c) a PLMN of the Equivalent PLMN list. An acceptable cell may be a cell served by a PLMN of the Equivalent PLMN list. A PLMN ID broadcast by an acceptable cell may satisfy the UE's RNA configuration.

An "RNA suitable cell" may be a suitable cell to the UE, if the PLMN identity, cell identity, RANAC, and/or TAC broadcast by the suitable cell matches the UE's RNA configuration.

An "RNA acceptable cell" may be an acceptable cell to the UE, if the PLMN identity, cell identity, RANAC, and/or TAC broadcast by the acceptable cell matches the UE's RNA configuration.

FIG. 1 is a flowchart for a method 100 of triggering an RNAU procedure performed by an RRC_INACTIVE UE, according to an example implementation of the present application. In action 102, an RRC_INACTIVE UE may be configured with a list of Tracking Area Identities (TAIs), or a list of RAN area IDs, as an RNA configuration. In action 104, the UE finds a suitable cell. It may be optional for the suitable cell to broadcast a tracking area code in system information, such as a System Information Block Type 1 (SIB1). In action 106, if the suitable cell does not broadcast the tracking area code (e.g., TrackingAreaCode), the UE may trigger an RNAU procedure (e.g., the UE may initiate an RRC connection resume procedure by transmitting an RRC message (e.g., RRC Resume Request message) to the suitable cell). The RNAU procedure may be triggered upon the UE not receiving the tracking area code broadcast by the suitable cell.

In one implementation, if the periodic RNAU timer does not expire, and if a UE finds a suitable cell and this suitable cell does not broadcast tracking area code (e.g., the found suitable cell does not meet the UE's RNA suitable cell), the UE may continue the cell reselection evaluation process.

In one implementation, if the periodic RNAU timer does not expire, and if a UE finds a suitable cell and this suitable cell does not broadcast tracking area code (e.g., the found suitable cell does not meet the UE's RNA suitable cell), the UE may trigger an RNAU procedure (e.g., transmitting an RRC Resume Request message to such a suitable cell). It should be noted that the UE may continue the cell reselection evaluation process when remaining in the RRC_INACTIVE state.

In one implementation, the RRC_INACTIVE state may include an "any cell selection" sub-state and a "camped normally" sub-state. In one implementation, the RRC_INACTIVE state may include an "any cell selection" sub-state, a "camped normally" sub-state, and a "camped on any cell" sub-state. If the periodic RNAU timer does not expire and a UE cannot find any suitable cell during a cell reselection evaluation process, the UE may enter the "any cell selection" sub-state or the "camped on any cell" sub-state. In one implementation, the UE may enter the "camped on any cell" sub-state if the UE finds an acceptable cell (e.g., RNA acceptable cell) in the "camped normally" sub-state or the "any cell selection" sub-state.

Figure 2:
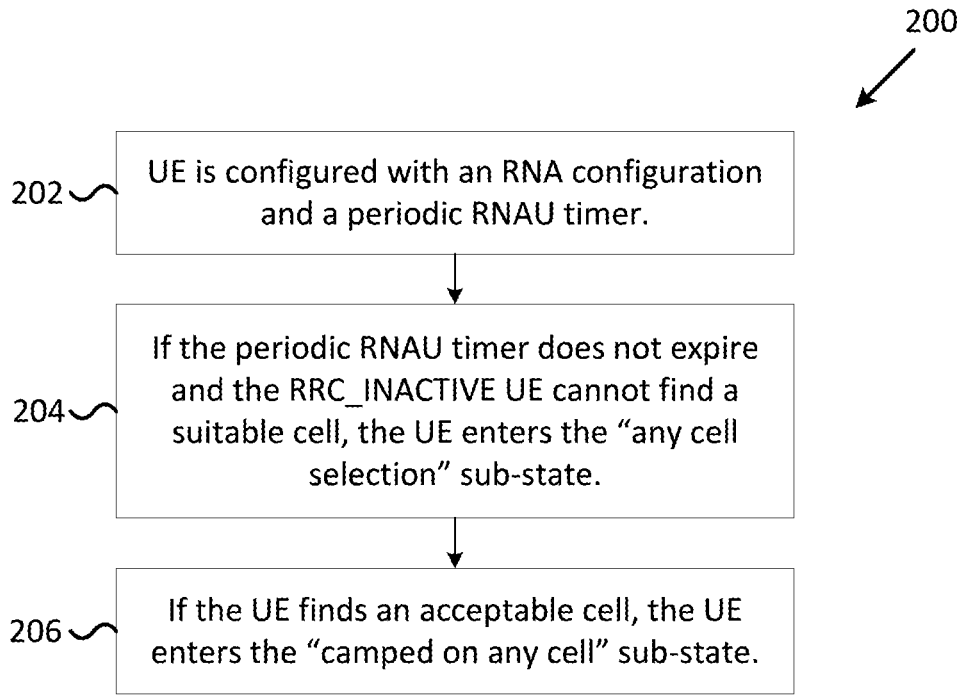
FIG. 2 is a flowchart for a method of sub-state transition performed by an RRC_INACTIVE UE, according to an example implementation of the present application.

FIG. 2 is a flowchart for a method 200 of sub-state transition performed by an RRC_INACTIVE UE, according to an example implementation of the present application. In action 202, the RRC_INACTIVE UE may be configured with an RNA configuration and a periodic RNAU timer. In action 204, if the periodic RNAU timer does not expire and the RRC_INACTIVE UE cannot find a suitable cell, the UE may enter the "any cell selection" sub-state. In action 206, if the UE finds an acceptable cell, the UE may enter the "camped on any cell" sub-state.

In one implementation, if a UE triggers a cell reselection evaluation process, the UE may perform cell reselection based on a priority order of cells. In one implementation, the UE may receive the priority order of cells (or the priority of a cell) used in the cell reselection evaluation process. In one implementation, the UE may receive the priority order of cells via system information from a camped cell, or through dedicated signaling (e.g., an RRC Release message with suspend configuration, which may include the priority order or the priority of a cell) from the last serving cell. In one implementation, an RNA configuration of the UE may be configured by the last serving cell. In one implementation, the UE may receive the priority order of cells through dedicated signaling from a cell that may not be the last serving cell, and an RNA configuration of the UE may be configured by the cell during an RNAU procedure triggered by the UE. The priority order may be pre-configured or based on UE's implementation. In one implementation, if the priority order of cells configured by different approaches conflict with each other, the UE may apply the priority order of cells provided by the dedicated signaling received from the last serving cell. In one implementation, if the priority order of cells configured by different approaches conflict with each other, the UE may apply the priority order of cells provided by the system information received from the latest camped cell. In one implementation, if the priority order of cells configured by different approaches conflict with each other, the UE may apply the priority order of cells provided by the dedicated signaling received from a cell that may not be the last serving cell.

In one implementation, the priority order of cells, from the highest to the lowest, may be RNA suitable cells, RNA acceptable cells, suitable cells, and acceptable cells. In one implementation, a four-bit bitmap may be used to indicate a priority level of each cell type. For example, the first bit may correspond to the RNA suitable cell, the second bit may correspond to the RNA acceptable cell, the third bit may correspond to the suitable cell, and the fourth bit may correspond to the acceptable cell. If a bit is set to '1', the corresponding cell type may be treated as having a high priority. The order of the cell types from the highest priority to the lowest priority (or from the lowest priority to the highest priority) may follow a pre-defined rule.

In one implementation, a one-bit flag may be used to indicate whether a pre-defined priority order is adopted. For example, if the flag is '1', a UE may be allowed to adopt the pre-defined priority order. If the flag is absent or set to '0', the UE may not be allowed to adopt the pre-defined priority order. In one implementation, the pre-defined priority order from the highest priority to the lowest priority may be RNA suitable cells, RNA acceptable cells, suitable cells, and acceptable cells. In one implementation, the pre-defined priority order from the highest priority to the lowest priority may be RNA suitable cells and RNA acceptable cells. In one implementation, the UE may prioritize an RNA suitable cell in a cell reselection evaluation process. How to prioritize the RNA suitable cell in the cell reselection evaluation process may be based on configurations, broadcasting system information, or pre-defined rules.

In one implementation, the described priority order in the cell reselection evaluation process may be applied for the same frequency. In one implementation, the described priority order in the cell reselection evaluation process may be applied across frequency bands (or ranges). In one implementation, a frequency priority may be adopted in the cell reselection evaluation process to indicate a priority order of cells operating in different frequency ranges, or indicate the priority of different frequency ranges which cells may operate in. In one implementation, a cell may be assigned a cell-specific priority (e.g., the described priority order), and the frequency that the cell operates on may be assigned a frequency priority. In the cell reselection evaluation process, the UE may treat the cell-specific priority to be higher than the frequency priority, lower than the frequency priority, or to override the frequency priority.

In one implementation, a timer T1 (e.g., timer_priority) may be required if a UE adopts a prioritization rule. The prioritization rule may be a priority order as (from the highest priority to the lowest priority) RNA suitable cells, RNA acceptable cells, suitable cells and acceptable cells. It should be noted that the prioritization rule may also be (a) prioritizing RNA suitable cells, (b) prioritizing RNA suitable cells and RNA acceptable cells, or (c) prioritizing RNA suitable cells and suitable cells. The UE may start the timer T1 if the UE adopts the prioritization rule when the UE triggers a cell reselection evaluation process. The UE may stop the timer T1 when the UE (re)selects a cell based on the prioritization rule. In one implementation, the UE may ignore or stop adopting the prioritization rule when the timer T1 expires. For example, if the prioritization rule is a priority order as (from the highest priority to the lowest priority) RNA suitable cells, RNA acceptable cells, suitable cells and acceptable cells, after the timer T1 expires, the RNA acceptable cells may not be prioritized over the suitable cells.

In one implementation, the UE may attempt to find a cell that belongs to its configured RNA (e.g., RNA suitable cell, RNA acceptable cell) to camp on when the UE is in the "any cell selection" sub-state. In one implementation, the UE may attempt to find a suitable cell, an acceptable cell, an RNA suitable cell or an RNA acceptable cell to camp on when the UE is in the "any cell selection" sub-state.

In one implementation, if a UE finds an RNA acceptable cell, the UE may enter the "camped on any cell" sub-state. If the UE finds an RNA suitable cell, the UE may enter the "camped normally" sub-state. The "camped on any cell" sub-state and "camped normally" sub-state may be in the RRC_INACTIVE state.

Figure 3:
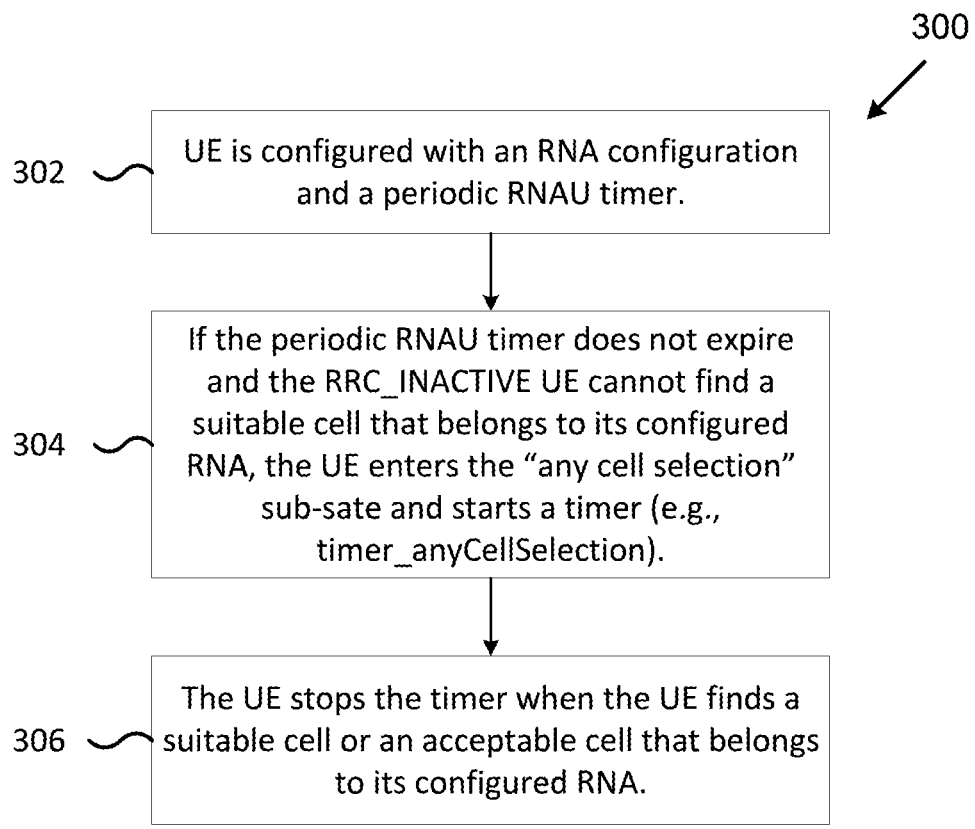
FIG. 3 is a flowchart for a method performed by an RRC_INACTIVE UE in an "any cell selection" sub-state, according to an example implementation of the present application.

FIG. 3 is a flowchart for a method 300 performed by an RRC_INACTIVE UE in an "any cell selection" sub-state, according to an example implementation of the present application. In action 302, the RRC_INACTIVE UE may be configured with an RNA configuration and a periodic RNAU timer. In action 304, if the RNAU timer does not expire and the RRC_INACTIVE UE cannot find a suitable cell that belongs to its configured RNA, the UE may enter the "any cell selection" sub-state and start a timer T2 (e.g., timer_anyCellSelection). In action 306, the UE may stop the timer T2 when the UE finds a suitable cell or an acceptable cell that belongs to its configured RNA.

In one implementation, if a UE enters the "any cell selection" sub-state, the UE may start a timer T2 (e.g., timer_anyCellSelection). The timer T2 may be pre-defined. The timer T2 may be provided by the last serving gNB via an RRC message (e.g., an RRC Release message with suspend configuration). For example, the timer T2 may be included in the suspend configuration. In one implementation, before the timer T2 expires, the UE may attempt to find an RNA acceptable cell or an RNA suitable cell to camp on. If the UE finds an RNA acceptable cell or an RNA suitable cell, the UE may stop the timer T2 and enter the "camped on any cell" sub-state or the "camped normally" sub-state. In one implementation, the UE may stop the timer T2 when the periodic RNAU timer expires. If the timer T2 expires, the UE may attempt to find a suitable cell or an acceptable cell of any PLMN, an RNA suitable cell, or an RNA acceptable cell to camp on. In one implementation, in the "any cell selection" sub-state, the UE may prioritize an RNA suitable cell or an RNA acceptable cell. Prioritizing an RNA suitable cell or an RNA acceptable cell in the "any cell selection" sub-state may be based on the configurations, broadcasting system information, or pre-defined rules in one implementation.

In one implementation, a UE may be given a priority order via system information or dedicated signaling, where suitable cells, acceptable cells, RNA suitable cells, and RNA acceptable cells may have different priorities. For example, the priority order (from the highest priority to the lowest priority) may be RNA suitable cells, RNA acceptable cells, suitable cells, and acceptable cells. The priority order may be provided by the last serving cell via an RRC message (e.g., an RRC Release message with suspend configuration). The priority order may be included in the suspend configuration. The priority order may be pre-configured by the UE's upper layer (e.g., RRC layer, Non-Access Stratum (NAS) layer). In one implementation, the UE may start a timer T3 (e.g., timer_AnyCellSelectionPriority) when the UE applies the prioritization order in the "any cell selection" sub-state for cell (re)selection. If the timer T3 expires, the UE may not apply the prioritization order in the "any cell selection" sub-state for cell (re)selection. If the UE (re)selects a cell based on the prioritization order, the UE may stop the timer T3. In one implementation, if the periodic RNAU timer expires, the UE may stop the timer T3.

In one implementation, a UE may be in the "any cell selection" sub-state when the UE is camped neither on a suitable cell nor on an acceptable cell. In one implementation, if the periodic RNAU timer expires and the UE is in the "any cell selection" sub-state, the UE may stay in the "any cell selection" sub-state of the RRC_INACTIVE state, and the UE may not restart the periodic RNAU timer. In one implementation, if the periodic RNAU timer expires and the UE is in the "any cell selection" sub-state, the UE may set a variable (e.g., pendingRnaUpdate) to "TRUE." In one implementation, if the periodic RNAU timer expires and the UE is in the "camped on any cell" sub-state, the UE may set the variable (e.g., pendingRnaUpdate) to "TRUE." Once the UE enters the "camped normally" or "camped on any cell" sub-state (e.g., the UE camps on a (RNA) suitable cell or an (RNA) acceptable cell), the UE may trigger the corresponding actions (e.g., the UE may perform an RRC connection resume procedure) in response to the expiration of the periodic RNAU timer. In one implementation, once the UE enters the "camped normally" or "camped on any cell" sub-state (e.g., the UE camps on a (RNA) suitable cell or an (RNA) acceptable cell), the UE may initiate an RNAU procedure.

In one implementation, if the periodic RNAU timer expires and the UE is in the "any cell selection" sub-state, the UE may stay in the "any cell selection" sub-state and start a timer (e.g., the periodic RNAU timer). In one implementation, the UE may set a variable (e.g., pendingRnaUpdate) to "TRUE." Doing so may imply that the UE may restart the periodic RNAU timer. The UE may also restart the periodic RNAU timer and cancel the triggering of an RNAU procedure.

In one implementation, a UE may freeze the periodic RNAU timer (e.g., pause the timer and keep a frozen count value) when the UE goes/transitions to the "any cell selection" sub-state of the RRC_INACTIVE state. The UE may resume the periodic RNAU timer (e.g., resume the timer from the frozen count value) when the UE leaves the "any cell selection" sub-state.

In one implementation, if the RNAU timer expires and the RRC_INACTIVE UE cannot find any suitable cell, the UE may enter the "any cell selection" sub-state and start a timer T2 (e.g., timer_anyCellSelection). In one implementation, if the RNAU timer expires and the RRC_INACTIVE UE cannot find a suitable cell that belongs to its configured RNA, the UE may enter the "any cell selection" sub-state and start the timer T2.

In one implementation, the UE may stop the timer T2 (e.g., timer_anyCellSelection) when the UE finds a suitable cell or an acceptable cell. In one implementation, the UE may stop the timer T2 when the UE finds a suitable cell or an acceptable cell that belongs to its configured RNA.

Figure 4:
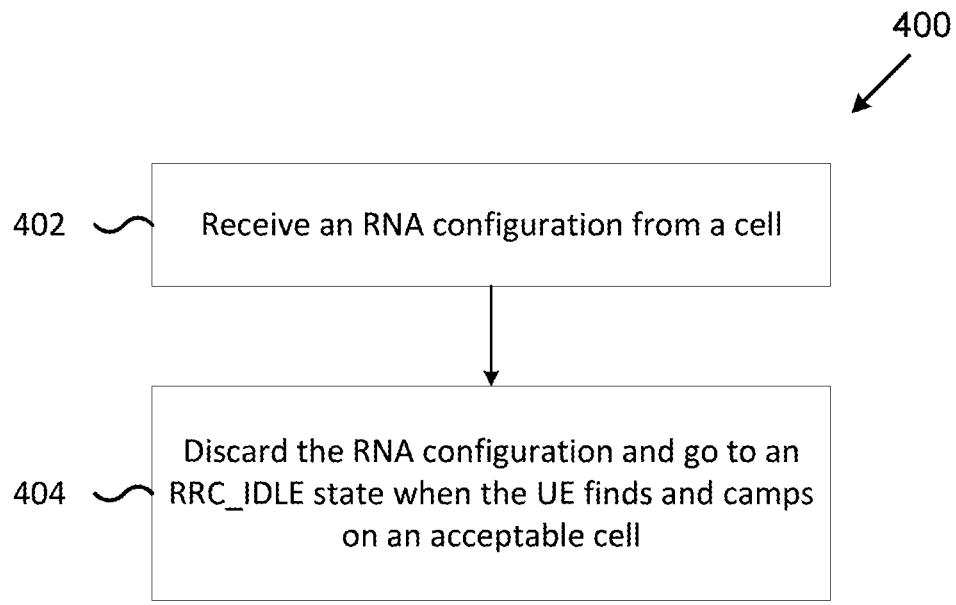
FIG. 4 is a flowchart for a method performed by an RRC_INACTIVE UE, according to an example implementation of the present application.

FIG. 4 is a flowchart for a method 400 performed by a UE in the RRC_INACTIVE state, according to an example implementation of the present application. In action 402, the UE may receive an RNA configuration from a cell. In action 404, the UE may discard the RNA configuration and go/transition to an RRC IDLE state when the UE finds and camps on an acceptable cell.

In one implementation, a UE may enter the "camped on any cell" sub-state when the UE camps on an acceptable cell. In one implementation, if the periodic RNAU timer expires and/or the UE cannot send an RRC message to any cell (e.g., the UE may be in the "any cell selection" sub-state or the "camped on any cell" sub-state), the UE may discard (e.g., delete/release) the RNA configuration. The UE's last serving cell may also delete/release the UE context after the periodic RNAU timer expires and no request for UE context from other cells is received and no RNAU request from the UE is received. In one implementation, if the UE deletes/releases the RNA configuration, the UE may go/transition to an RRC_IDLE state. For example, when the UE in the RRC_INACTIVE state camps on an acceptable cell to obtain limited services, the UE may go/transition to the RRC_IDLE state. In one implementation, if the UE deletes/releases the RNA configuration, the UE may stay in the RRC_INACTIVE state. Once the UE camps on a cell, the UE may send an RRC message (e.g., RRC Resume Request message) to the camped cell. The camped cell may ask the UE to establish an RRC connection by sending an RRC message (e.g., RRC Setup message) to the UE.

In one implementation, if the periodic RNAU timer expires and a UE cannot send an RRC message to any cell (e.g., the UE may be in the "any cell selection" sub-state or the "camped on any cell" sub-state), once the UE camps on a cell, the UE may perform an RNAU procedure (e.g., by sending an RRC message (e.g., RRC Resume Request message) to the camped cell).

Figure 5:
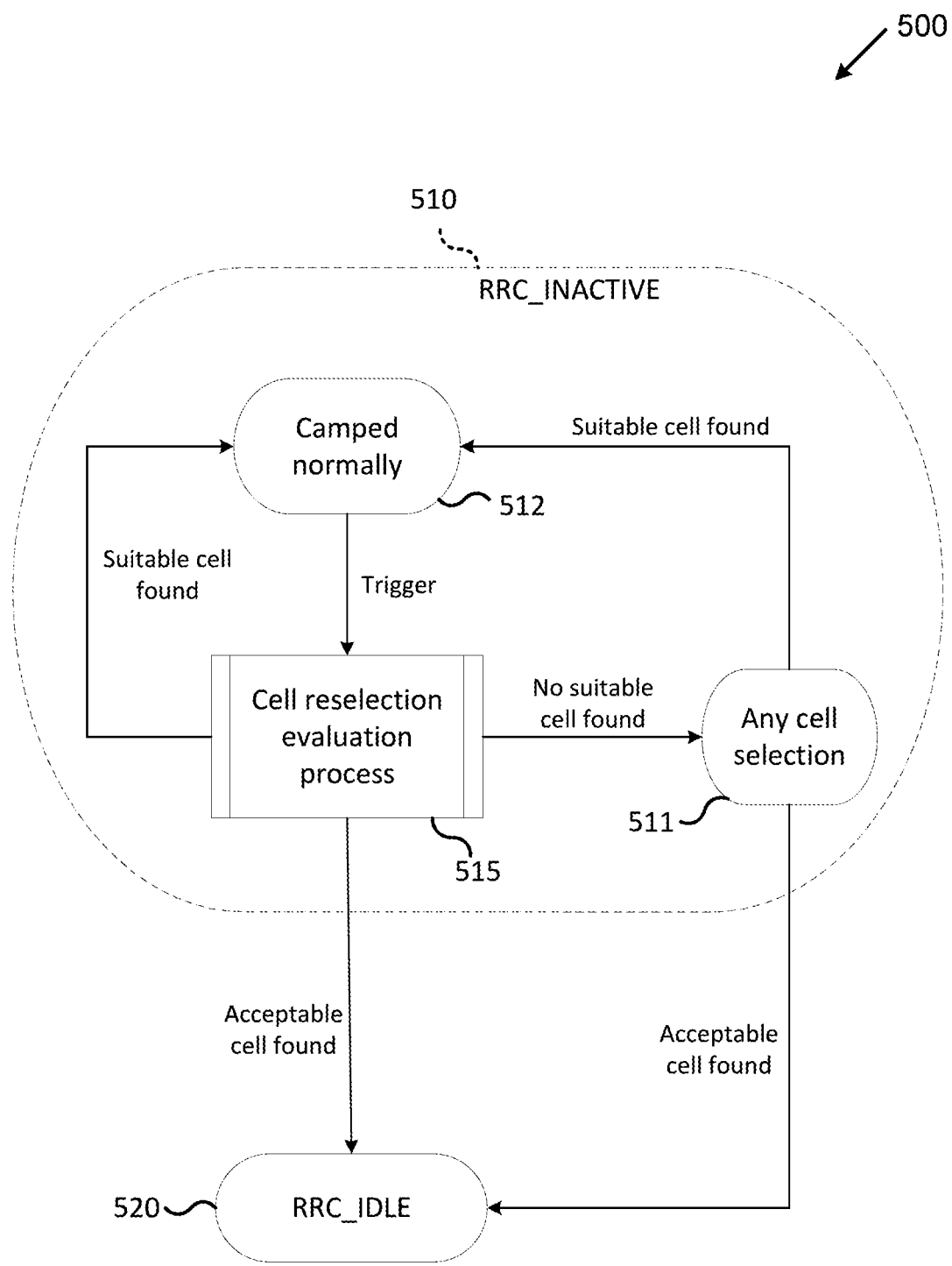
FIG. 5 is an example state transition diagram of a UE, according to an example implementation of the present application.

FIG. 5 is an example state transition diagram 500 of a UE, according to an example implementation of the present application. An RRC state of the UE may include an RRC_INACTIVE state 510 and an RRC_IDLE state 520. It should be noted that the UE may have other RRC states (e.g., an RRC_CONNECTED state) that are not shown in the figure. In one implementation, the RRC_INACTIVE state 510 may include an "any cell selection" sub-state 511 and a "camped normally" sub-state 512.

When the UE is in the "any cell selection" sub-state 511, the UE may attempt to find a cell to camp on. The UE may go/transition to the "camped normally" sub-state 512 if the UE finds a suitable cell, and the UE may go/transition to the RRC_IDLE state 520 if the UE finds an acceptable cell to camp on (e.g., action 404 in FIG. 4). In one implementation, the UE may take its RNA configuration into consideration. For example, the UE may attempt to find a suitable cell that is configured in the UE's RNA configuration (e.g., an RNA suitable cell) when the UE is in the "any cell selection" sub-state 511. The UE may go/transition to the "camped normally" sub-state 512 when the UE finds a suitable cell that is configured in the UE's RNA configuration. The UE may then trigger an RNAU procedure (e.g., transmitting an RRC Resume Request message to the found suitable cell).

When the UE is in the "camped normally" sub-state 512, the UE may trigger a cell reselection evaluation process 515. The UE may go/transition to the "any cell selection" sub-state 511 if the UE cannot find a suitable cell during the cell reselection evaluation process 515, and the UE may go/transition to the "camped normally" sub-state 512 if the UE finds a suitable cell. The UE may go/transition to the RRC_IDLE state 520 if the UE finds an acceptable cell during the cell reselection evaluation process 515. In one implementation, the UE may take its RNA configuration into consideration. For example, during the cell reselection evaluation process 515, the UE may go/transition to the "any cell selection" sub-state 511 if the UE cannot find an RNA suitable cell. The UE may go/transition to the "camped normally" sub-state 512 if the UE finds an RNA suitable cell. The UE may go/transition to the RRC_IDLE state 520 if the UE finds an RNA acceptable cell.

In one implementation, if an RRC_INACTIVE UE has no RNA configuration, the UE may send an RRC message (e.g., RRC Resume Request message) to the camped cell (e.g., a suitable cell, an RNA suitable cell, an acceptable cell, an RNA acceptable cell). The RRC message may include the UE's Inactive-Radio Network Temporary Identifier (I-RNTI), full I-RNTI or short I-RNTI. Based on the I-RNTI, full I-RNTI or short I-RNTI, the camped cell may or may not retrieve the UE's context from the last serving cell. The last serving cell or the camped cell may determine a new RNA configuration for the UE. The camped cell may send an RRC message (e.g., RRC Release message with suspend configuration) to the UE and keep the UE in the RRC_INACTIVE state. The new RNA configuration may be included in the suspend configuration. In one implementation, the RRC_INACTIVE UE without the RNA configuration may send an RRC message (e.g., RRC Resume Request message) that may include an indicator to the camped cell (e.g., a suitable cell, an RNA suitable cell, an acceptable cell, an RNA acceptable cell). The indicator may inform the camped cell that the UE does not have an RNA configuration. Based on the indicator, the camped cell may not provide an RNA configuration via delta signaling. If the camped cell configures the UE with an RNA configuration, the camped cell may apply the full RNA configuration.

In one implementation, after an RRC_INACTIVE UE that has no RNA configuration sends an RRC message (e.g., RRC Resume Request message) to a serving/camped cell, the serving/camped cell may not send an RRC message (e.g., RRC Reject message without suspend configuration) back to the RRC_INACTIVE UE. In one implementation, after the serving/camped cell receives the RRC message (e.g., RRC Resume Request message) from the RRC_INACTIVE UE that has no RNA configuration, the serving/camped cell may not keep the UE in the RRC_INACTIVE state still having no RNA configuration. The serving/camped cell may not keep the UE without RNA configuration in the RRC_INACTIVE state. The serving/camped cell may give the UE a new RNA configuration and keep the UE in the RRC_INACTIVE state. The serving/camped cell may move the UE to the RRC_IDLE state by sending an RRC message (e.g., an RRC Release message without a suspend configuration) to the UE. In one implementation, the RRC_INACTIVE UE may go/transition to the RRC_IDLE state when the UE has no RNA configuration. In one implementation, the serving/camped cell may request the UE to establish an RRC connection by sending an RRC message (e.g., RRC Setup message) to the UE. In one implementation, the serving/camped cell may confirm the RRC resumption request to be successful by sending an RRC message (e.g., RRC Resume message) to the UE. In one implementation, the serving/camped cell may keep the UE in the RRC_INACTIVE state and give the UE a new RNA configuration by sending an RRC message (e.g., an RRC Release message with suspend configuration) to the UE.

Figure 6:
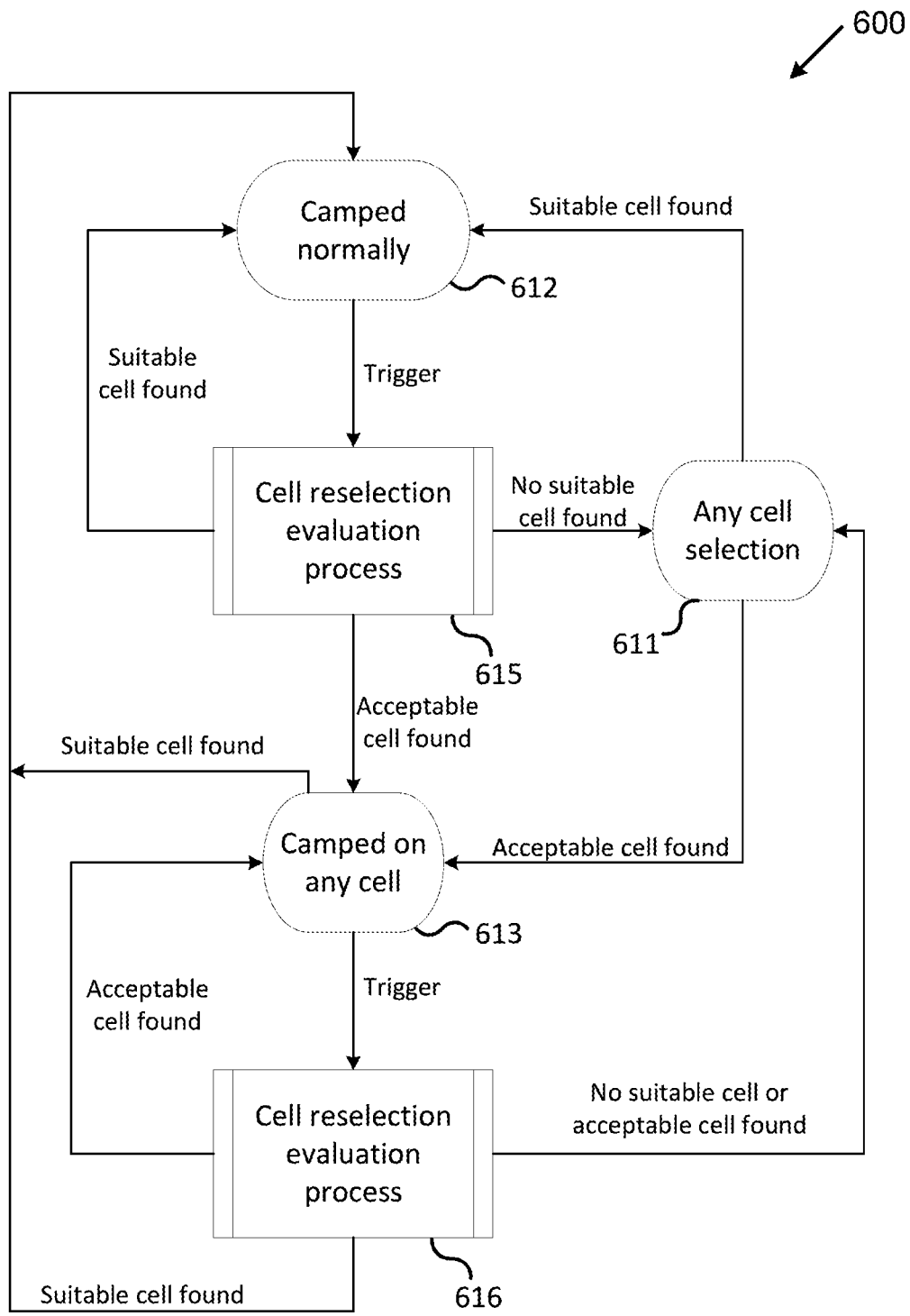
FIG. 6 is an example sub-state transition diagram of a UE, according to an example implementation of the present application.

FIG. 6 is an example sub-state transition diagram 600 of a UE, according to an example implementation of the present application. An RRC state of the UE may include an RRC_INACTIVE state and an RRC_IDLE state. In one implementation, the RRC_INACTIVE state may include an "any cell selection" sub-state 611, a "camped normally" sub-state 612, and a "camped on any cell" sub-state 613. In another implementation, the "any cell selection" sub-state 611 and the "camped normally" sub-state 612 may belong to the RRC_INACTIVE state, and the "camped on any cell" sub-state 613 may belong to the RRC_IDLE state. In still another implementation, the "camped normally" sub-state 612 may belong to the RRC_INACTIVE state, and the "any cell selection" sub-state 611 and the "camped on any cell" sub-state 613 may belong to the RRC_IDLE state.

In one implementation, if a UE finds an acceptable cell (e.g., an RNA acceptable cell) during a cell reselection evaluation process 615, during a cell reselection evaluation process 616, or when the UE is in the "any cell selection" sub-state 611, the UE may go/transition to the "camped on any cell" sub-state 613. In one implementation, if the UE in the "camped normally" sub-state 612 cannot find a suitable cell (e.g., an RNA suitable cell), but finds an acceptable cell (e.g., an RNA acceptable cell), the UE may enter the "camped on any cell" sub-state 613. In one implementation, if the UE in the "any cell selection" sub-state 611 finds an acceptable cell (e.g., an RNA acceptable cell), the UE may enter the "camped on any cell" sub-state 613. In one implementation, if the UE in the "camped on any cell" sub-state 613 finds an acceptable cell (e.g., an RNA acceptable cell), the UE may stay in the "camped on any cell" sub-state 613.

In one implementation, if the UE enters the "camped on any cell" sub-state 613, the UE may perform at least one of the following procedures: (1) select and monitor the indicated paging channels of the cell; (2) monitor relevant system information; (3) perform necessary measurements for the cell reselection evaluation process 616 (shown in FIG. 6); (4) execute the cell reselection evaluation process 616 when the UE internally triggers the cell reselection evaluation, and/or when information on the Broadcast Control Channel (BCCH) used for the cell reselection evaluation process has been modified; (5) regularly attempt to find a suitable cell or an acceptable cell trying all frequencies of all Radio Access Technologies (RATs) that are supported by the UE; and (6) regularly attempt to find an RNA suitable cell or an RNA acceptable cell trying all frequencies of the same RAT supported by the UE.

In one implementation, a UE may set a higher priority to an RNA suitable cell during a cell reselection evaluation process (e.g., the cell reselection evaluation processes 615 and 616 in FIG. 6). In one implementation, the UE may be given a priority order via system information, or dedicated signaling, where suitable cells, acceptable cells, RNA suitable cells, and RNA acceptable cells may have different priorities. For example, the priority order (from the highest priority to the lowest priority) may be RNA suitable cells, RNA acceptable cells, suitable cells, and acceptable cells. The priority order may be provided by the last serving cell via an RRC message (e.g., an RRC Release message with suspend configuration). The priority order may be included in the suspend configuration. The priority order may be pre-configured by the UE's upper layer. If more than one priority orders are provided (e.g., by system information of the RNA acceptable cell and by the dedicated signaling of the last serving cell), the UE may adopt the priority order in the dedicated signaling of the last serving cell.

In one implementation, the UE may start a timer T4 (e.g., timer_OnAnyCellPriority) when it enters the "camped on any cell" sub-state 613 (shown in FIG. 6) or when it enters the cell reselection evaluation process 616. The timer may be pre-defined, provided by the last serving gNB via an RRC message (e.g., an RRC Release message with suspend configuration, where the timer may be included in the suspend configuration) or broadcast by the currently camped cell. In one implementation, before the timer T4 expires, the UE may find an RNA suitable cell rather than a suitable cell. In one implementation, before the timer T4 expires, the UE may prioritize an RNA suitable cell in the cell reselection evaluation process 616. In one implementation, before the timer T4 expires, the UE may find an RNA acceptable cell rather than an acceptable cell. In one implementation, before the timer T4 expires, the UE may prioritize an RNA acceptable cell in the cell reselection evaluation process 616. In one implementation, the UE may stop the timer T4 when the UE finds an RNA suitable cell or an RNA acceptable cell. In one implementation, the UE may stop the timer T4 when the UE finds a cell. In one implementation, the UE may stop the timer T4 when the periodic RNAU timer expires. If the timer T4 expires, the UE may start to find a suitable cell or an acceptable cell. If the timer T4 expires, the UE may trigger an RNAU procedure (e.g., transmitting an RRC Resume Request message to a camped cell).

If a UE finds a suitable cell (e.g., an RNA suitable cell) during a cell reselection evaluation process 615, during a cell reselection evaluation process 616, or when the UE is in the "any cell selection" sub-state 611 or the "camped on any cell" sub-state 613, the UE may go/transition to the "camped normally" sub-state 612. In one implementation, if the UE in the "any cell selection" sub-state 611 finds a suitable cell (e.g., an RNA suitable cell), the UE may enter the "camped normally" sub-state 612. In one implementation, if the UE in the "camped on any cell" sub-state 613 finds a suitable cell (e.g., an RNA suitable cell), the UE may enter the "camped normally" sub-state 612. In one implementation, if the UE in the "camped normally" sub-state 612 finds a suitable cell (e.g., an RNA suitable cell) during the cell reselection evaluation process 615, the UE may stay in the "camped normally" sub-state 612.

In one implementation, irrespective of the sub-state in which a UE is, the UE may trigger an RNAU procedure when the periodic RNAU timer expires.

In one implementation, if a UE finds a suitable cell during a cell reselection evaluation process 615 or 616 or when the UE is in the "any cell selection" sub-state 611 or in the "camped on any cell" sub-state 613, the UE may trigger an RNAU procedure (e.g., transmitting an RRC Resume Request message to the suitable cell). In one implementation, if the UE finds an acceptable cell during the cell reselection evaluation process 615 or 616 or when the UE is in the "any cell selection" sub-state 611, the UE may trigger an RNAU procedure (e.g., transmitting an RRC Resume Request message to the acceptable cell).

Only limited services (e.g., a UE originating emergency calls, receiving ETWS and CMAS notifications) may be available on an acceptable cell in one implementation. In one implementation, the UE may initiate an RNAU procedure to an acceptable cell (e.g., RNA acceptable cell). For instance, the RNAU procedure may be triggered by expiry of the periodic RNAU timer. For instance, the RNAU procedure may be triggered when the UE camps on an acceptable cell which does not belong to the UE's configured RNA.

In one implementation, if resumption of an RRC connection is triggered due to an RNA update on an acceptable cell (e.g., RNA acceptable cell), a UE may select '2' as the Access Category (e.g., emergency), '3' as the Access Category (e.g., Mobile Originated (MO)-signaling) or 'X' (e.g., a standardized RNAU access category, a standardized RNAU on an RNA acceptable cell access category) as the Access Category. It should be noted that 'X' may be an integer value. The UE may perform an access control procedure using the selected Access Category. If the access attempt is barred, the UE may set a variable "pendingRnaUpdate" to 'TRUE'.

In one implementation, a UE may set a resume cause value in an RRC message (e.g., RRC Resume Request message or RRC Resume Request1 message) to be "rna-Update-X". For example, "rna-Update-X" may let an acceptable cell (e.g., RNA acceptable cell) know that the UE requesting RNAU is in the "camped on any cell" sub-state 613.

In one implementation, a UE may indicate that the UE is in the "camped on any cell" sub-state 613 via a one-bit flag. For example, the flag being '1' may represent that the UE is in the "camped on any cell" sub-state 613, and the flag being '0' may represent that the UE is not in the "camped on any cell" sub-state 613. The one-bit flag may be optional. In one implementation, absence of the flag may indicate that the UE is not in the "camped on any cell" sub-state 613. The UE may set a resume cause value in an RRC message (e.g., RRC Resume Request message or RRC Resume Request1 message) to be "emergency," "MO-signalling," or "rna-Update," if resumption of the RRC connection is triggered due to an RNAU procedure on an acceptable cell (e.g., RNA acceptable cell). Furthermore, the UE may indicate that it is in the "camped on any cell" sub-state 613. The combination of the "camped on any cell" flag and the resume cause may let the acceptable cell know that the UE requiring RNAU camps on an acceptable cell.

In one implementation, a UE may send its PLMN information (e.g., registered PLMN, selected PLMN, PLMNs in the UE's equivalent PLMN list) to an acceptable cell (e.g., RNA acceptable cell). For example, the UE may send its registered PLMN or selected PLMN to the acceptable cell via an RRC message (e.g., RRC Resume Request message).

In one implementation, a UE may send its PLMN information (e.g., registered PLMN, selected PLMN, PLMNs in the UE's equivalent PLMN list) to the last serving cell via an RRC message (e.g., RRC Setup Complete message). In one implementation, the last serving cell may request the UE to send its PLMN information via an RRC message. In one implementation, the UE's camped/serving cell (e.g., suitable cell, RNA suitable cell, acceptable cell, RNA acceptable cell) may request the UE's PLMN information from the last serving cell via Xn signaling or via the core network. In one implementation, the last serving gNB may store the received PLMN information (e.g., the PLMN information as the UE context of the UE). In one implementation, the last serving gNB may store the RNA configuration for the UE (e.g., the RNA configuration as the UE context of the UE).

An acceptable cell (e.g., an RNA acceptable cell), if able to resolve a gNB identity contained in an I-RNTI (or short I-RNTI), may request the last serving gNB for an updated RNA configuration. The last serving gNB may provide the updated RNA configuration to the acceptable cell. The acceptable cell may also request the last serving gNB for the stored RNA configuration of the UE. The last serving gNB may provide the stored RNA configuration for the UE to the acceptable cell. The acceptable cell may also retrieve the UE context from the core network (e.g., 5GC). The acceptable cell may also request the core network for the UE's updated RNA configuration. The acceptable cell may also receive the UE's updated RNA configuration from the core network. The acceptable cell may also determine the updated RNA configuration. The acceptable cell may provide the updated RNA configuration in an RRC message (e.g., RRC Release message with suspend configuration) and send the RRC message to the UE. It should be noted that the updated RNA configuration may be included in the suspend configuration. In one implementation, the acceptable cell may not send the request to the last serving gNB for UE context retrieval. The UE context may be still in the last serving cell. In one implementation, the acceptable cell may not move the UE to an RRC_CONNECTED state. The acceptable cell may keep the UE in the "camped on any cell" sub-state 613.

In one implementation, an acceptable cell (e.g., an RNA acceptable cell) may send a request to the last serving gNB for the UE context retrieval. The last serving gNB may provide the UE context to the acceptable cell. The acceptable cell may determine the updated RNA configuration for the UE. The acceptable cell may provide the updated RNA configuration in an RRC message (e.g., RRC Release message with suspend configuration) and send the RRC message to the UE. It should be noted that the updated RNA configuration may be included in the suspend configuration. The acceptable cell may send the UE context release message to the last serving gNB. In one implementation, the acceptable cell may not move the UE to an RRC_CONNECTED state. The acceptable cell may keep the UE in the "camped on any cell" sub-state 613.

In one implementation, a cell may broadcast in system information (e.g., SIB1) whether it supports RNA update as a suitable cell (e.g., an RNA suitable cell) or RNA update as an acceptable cell (e.g., an RNA acceptable cell). For example, a one-bit flag in system information may be required. The flag being '1' may represent that the cell supports the RNA update as an RNA acceptable cell, and the flag being '0' may represent that the cell does not support the RNA update as an RNA acceptable cell. Such flag may be optional. Absence of the flag may indicate that the cell does not support RNA update as an RNA acceptable cell. In one implementation, if the cell indicates that it does not support RNAU as an acceptable cell, the UE may not select such a cell as an acceptable cell. In one implementation, the UE may select such a cell as an acceptable cell, but the UE does not initiate an RNAU procedure to such a cell. In one implementation, if the cell indicates that it does not support an RNAU procedure as a suitable cell, the UE may not select such a cell as a suitable cell. In one implementation, the UE may select such a cell as a suitable cell, but the UE does not initiate an RNAU procedure to such a cell.

In one implementation, suitable cells (e.g., RNA suitable cells) and/or acceptable cells (e.g., RNA acceptable cells) may page an RRC_INACTIVE UE due to system information update. In one implementation, suitable cells and/or acceptable cells may page the RRC_INACTIVE UE due to ETWS/CMAS reception. In one implementation, suitable cells and/or acceptable cells may page the RRC_INACTIVE UE due to downlink data reception from a User Plane Function (UPF) or neighboring cells. In one implementation, suitable cells and/or acceptable cells may page the RRC_INACTIVE UE due to downlink signaling reception from an Access and Mobility Management Function (AMF) or neighboring cells.

In one implementation, the suitable cell (e.g., RNA suitable cell), rather than the acceptable cell (e.g., RNA acceptable cell), may page the RRC_INACTIVE UE due to downlink data reception from a core network (e.g., 5GC, UPF, AMF) or neighboring cells. In one implementation, the suitable cell, rather than the acceptable cell, may page the RRC_INACTIVE UE due to downlink signaling reception from the core network or neighboring cells. It should be noted that the paging may be RAN paging or CN paging.

Figure 7:
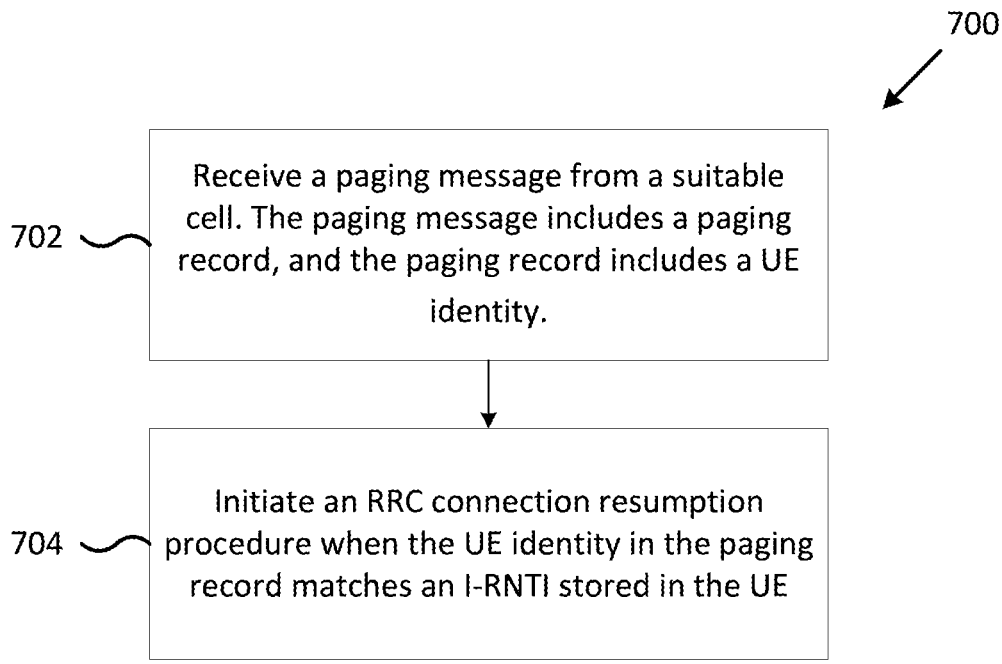
FIG. 7 is a flowchart for a method performed by an RRC_INACTIVE UE when the UE receives paging, according to an example implementation of the present application.

FIG. 7 is a flowchart for a method 700 performed by an RRC_INACTIVE UE when the UE receives paging, according to an example implementation of the present application. In action 702, a UE may receive a paging message from a suitable cell. The paging message may include a paging record, which may include a UE identity. In action 704, the UE may initiate an RRC connection resumption procedure when the UE identity in the paging record matches an I-RNTI stored in the UE. The RRC connection resumption procedure may also be referred to as the RRC connection resume procedure.

In one implementation, if a UE identity included in a paging record (included in a paging message) transmitted by suitable cells (e.g., RNA suitable cells) or acceptable cells (e.g., RNA acceptable cells) matches the UE's stored I-RNTI, the UE may initiate an RRC connection resumption procedure. The UE may select '0' as the Access Category and perform an access control procedure using the selected Access Category and one or more Access Identities provided by upper layers (e.g., RRC layer, NAS layer). If the access attempt is barred, the RRC connection resumption procedure may end. In one implementation, the UE may select 'Y' as the Access Category and perform the access control procedure using the selected Access Category and one or more Access Identities provided by upper layers. 'Y' may be an integer value. If the access attempt is barred, the RRC connection resumption procedure may end. 'Y' may refer to an Access Category that means MO-signaling resulting from paging, where the UE may be paged by an acceptable cell. In one implementation, the acceptable cell may set barring parameters corresponding to the 'Y' Access Category and always bar such Access Category. If the UE cannot access the acceptable cell due to RAN paging, the UE may perform an RRC connection setup (or resume) procedure whenever it camps on a suitable cell. An indicator may be included in an RRC message (e.g., RRC Setup message, RRC Resume Request message) to indicate that the access attempt is due to RAN paging, and possibly paged from an acceptable cell.

In one implementation, when a UE is in the "camped on any cell" sub-state 613, the UE may not receive paging due to downlink data reception from a core network (e.g., 5GC, UPF, AMF) or neighboring cells. In one implementation, when the UE is in the "camped on any cell" sub-state 613, the UE may not receive the paging due to downlink signaling reception from the core network or neighboring cells. In one implementation, when the UE is in the "any cell selection" sub-state 611, the UE may not support RAN paging.

In one implementation, if the UE receives RAN paging in the "camped on any cell" sub-state 613, the UE may initiate an RRC connection resume procedure to a found suitable cell when the UE finds the suitable cell (e.g., RNA suitable cell).

In one implementation, a cell may broadcast in system information (e.g., SIB1) whether it supports RAN paging as a suitable cell (e.g., RNA suitable cell) or RAN paging as an acceptable cell (e.g., RNA acceptable cell). For example, a one-bit flag in system information may be required. The flag being '1' may represent that the cell supports the RAN paging as an acceptable cell, and the flag being '0' may represent that the cell does not support the RAN paging as an acceptable cell. Such flag may be optional. If the flag is absent, it may represent that the cell does not support RAN paging as an acceptable cell or as a suitable cell. In one implementation, if the cell indicates that it does not support RAN paging as an acceptable cell, the UE may not select such cell as an acceptable cell.

In one implementation, a UE may support inter-RAT cell reselection function. In one implementation, an RRC_INACTIVE UE camping on (or served by) an NR cell may select a suitable cell or an acceptable cell that does not belong to the NR (e.g., E-UTRA). In one implementation, when the UE enters the "camped on any cell" sub-state 613 or the "any cell selection" sub-state 611, the UE may start a timer T5 (e.g., ExtendTimer_otherRAT). Before the timer expires, the UE may not attempt to find a cell in other RATs. That is, the UE may regularly attempt to find NR cells (e.g., suitable cell, RNA suitable cell, acceptable cell, RNA acceptable cell). If the timer expires, the UE may attempt to find a cell in all frequencies of all RATs the UE supports. The UE may (re)select cells in other RATs (e.g., E-UTRA). That is, before the timer T5 expires, the UE may be only allowed to camp on a cell (e.g., suitable cell, RNA suitable cell, acceptable cell, RNA acceptable cell) in NR. Upon the timer T5 expiry, the UE may camp on a cell in all RATs supported by the UE. In one implementation, if the UE (re)selects a cell in other RATs (e.g., E-UTRA), the UE may reset, restart or delete the timer T5.

In one implementation, the UE may attempt to find a cell in all frequencies of all RATs that the UE supports when the UE is in the "camped on any cell" sub-state 613 or the "any cell selection" sub-state 611. Upon finding a suitable or acceptable cell in other RATs (e.g., E-UTRA), the UE may start a timer (e.g., ExtendTimer_LTE). Before the timer expires, the UE may camp on the found cell (e.g., E-UTRA cell). The timer may be UE-specific, e.g., each UE may be configured with the timer individually, and each UE may keep one timer. The timer may be RAT-specific, e.g., the UE may start and count the timer used for a target RAT, or the UE camping on the same RAT may use the RAT-specific timer. The timer may be cell-specific, e.g., the UE may start and count the timer for the found cell, or the UE camping on the same cell may use the cell-specific timer. Once the timer expires, if the found cell is still suitable or acceptable, the UE may camp on it. Before the timer expires, if the found cell is not suitable or acceptable, the UE may reset, restart, freeze, or remove the timer. If the found cell is suitable or acceptable again, or if the UE finds another cell in the same RAT as the found cell, the UE may restart the timer from an initial value or resume the timer from a value when it is frozen. In one implementation, the timer may be pre-configured or configured by the last serving cell to the UE via RRC dedicated signaling (e.g., in an RRC Release message with suspend configuration).

In one implementation, if an RRC_INACTIVE UE camps on a cell in other RATs (e.g., E-UTRA), the RRC_INACTIVE UE may keep the RRC_INACTIVE related information (e.g., RNA configuration in NR, UE context in NR, (full) I-RNTI in NR, short I-RNTI in NR). In one implementation, the RRC_INACTIVE UE may keep the RRC_INACTIVE related information for a period of time. For example, the UE may start a timer T6 (e.g., Timer_KeepInativeInfo) when it camps on a cell in other RATs (e.g., E-UTRA). The UE may delete or release the RRC_INACTIVE related information when the timer T6 expires. Before the timer T6 expires, if the UE camps on a cell in NR (e.g., the UE camps on a cell belonging to the UE's configured RNA), the UE may stop the timer T6. If the UE camps on a cell in NR (e.g., the UE camps on a cell belonging to the UE's configured RNA) and the UE still has the RRC_INACTIVE related information in NR, the UE may stay in the RRC_INACTIVE state in NR. In one implementation, if the UE camps on a cell in NR, the UE may go/transition to the RRC_IDLE state and delete (or release) the RRC_INACTIVE related information. If the UE camps on a cell in NR, the UE may send an RRC message (e.g., RRC Resume Request message) to the camped cell in NR. If the UE camps to a cell in NR, the UE may perform a RNAU procedure to the camped cell.

In one implementation, a cell/gNB may determine an RNA configuration for a UE based on the UE's PLMN information (e.g., registered PLMN, selected PLMN, PLMNs in the equivalent PLMN list). The cell/gNB may receive the UE's PLMN information from a core network or from the UE. The cell/gNB may request the UE to report its PLMN information via dedicated signaling. The cell/gNB may send, to the UE, a dedicated signaling (e.g., UE Capability Enquiry message) that includes indicators (e.g., NR, PLMN information). If the UE receives the dedicated signaling (e.g., UE Capability Enquiry message) that includes the indicators, the UE may send a dedicated signaling (e.g., UE Capability Information message) that includes the UE's PLMN information (e.g., registered PLMN, selected PLMN, PLMNs in the equivalent PLMN list) to the cell/gNB. If the cell/gNB receives the UE's PLMN information (e.g., registered PLMN, selected PLMN, PLMNs in the equivalent PLMN list), the cell/gNB may determine and configure an RNA for the UE, wherein the RNA may be constituted by PLMNs (e.g., registered PLMN, selected PLMN, PLMNs in the equivalent PLMN list) supported by the UE. The cell/gNB may send the RNA configuration to the UE via a dedicated signaling (e.g., an RRC Release message including suspend configuration). In one implementation, the RNA configuration may be included in the suspend configuration.

Figure 8:
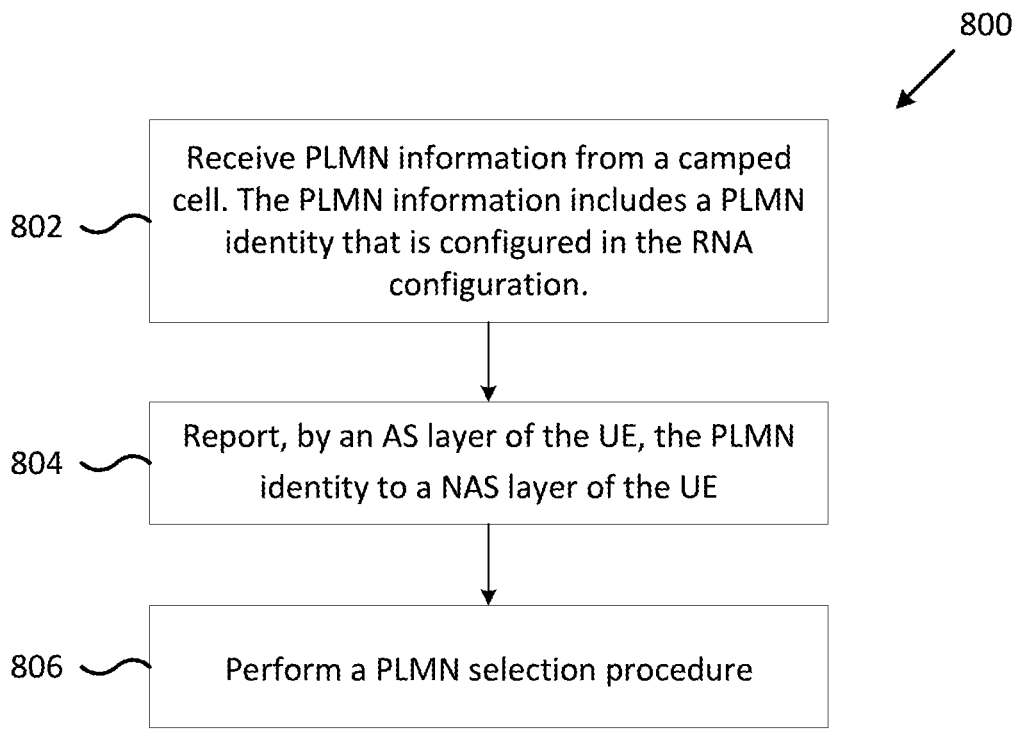
FIG. 8 is a flowchart for a method of PLMN selection performed by an RRC_INACTIVE UE, according to an example implementation of the present application.

FIG. 8 is a flowchart for a method 800 of PLMN selection performed by an RRC_INACTIVE UE, according to an example implementation of the present application. In action 802, an RRC_INACTIVE UE may receive PLMN information from a camped cell. In one implementation, the camped cell may be a cell that provides the UE's RNA configuration, an acceptable cell that the UE finds and camps on, or any other cell that the UE camps on. The PLMN information may include a PLMN identity that is configured in the UE's RNA configuration. In one implementation, the PLMN information may be carried in system information (e.g., SIB1) broadcast by the camped cell. In action 804, an Access Stratum (AS) layer of the UE may report the PLMN identity to a NAS layer of the UE. In action 806, the UE may perform a PLMN selection procedure.

In one implementation, when an RRC_INACTIVE UE performs PLMN selection, the RRC_INACTIVE UE may optimize PLMN search using an RNA configuration. In one implementation, the AS layer of the RRC_INACTIVE UE may report PLMN information (e.g., PLMN identities) configured in the UE's RNA configuration to the NAS layer of the UE. In one implementation, if a found PLMN (e.g., a high quality PLMN without a Reference Signal Received Power (RSRP) value, a PLMN for which the UE is able to read the PLMN identity from a cell although the PLMN may not satisfy a high-quality criterion) matches one of the PLMNs in the UE's RNA configuration, the UE (e.g., the AS layer) may report the found PLMN to the NAS layer. In one implementation, the high-quality criterion may be that the measured RSRP value of a cell is greater than or equal to 'Z' dBm (e.g., Z=−110).

It should be noted that in many cases, the UE may change the (selected or registered) PLMN after the UE sends an RRC message (e.g., RRC Resume Request message, RRC Setup Request message) to the cell. For example, when the UE sends an RRC message to the cell due to RAN paging, the UE may change the (selected or registered) PLMN during the RAN paging. For example, when the UE sends an RRC message to the cell due to RNAU, the UE may change the (selected or registered) PLMN during an RNAU procedure.

It should be noted that the NR gNB or the cell described above may be applied to any base station, regardless of the radio access technology.

Figure 9:
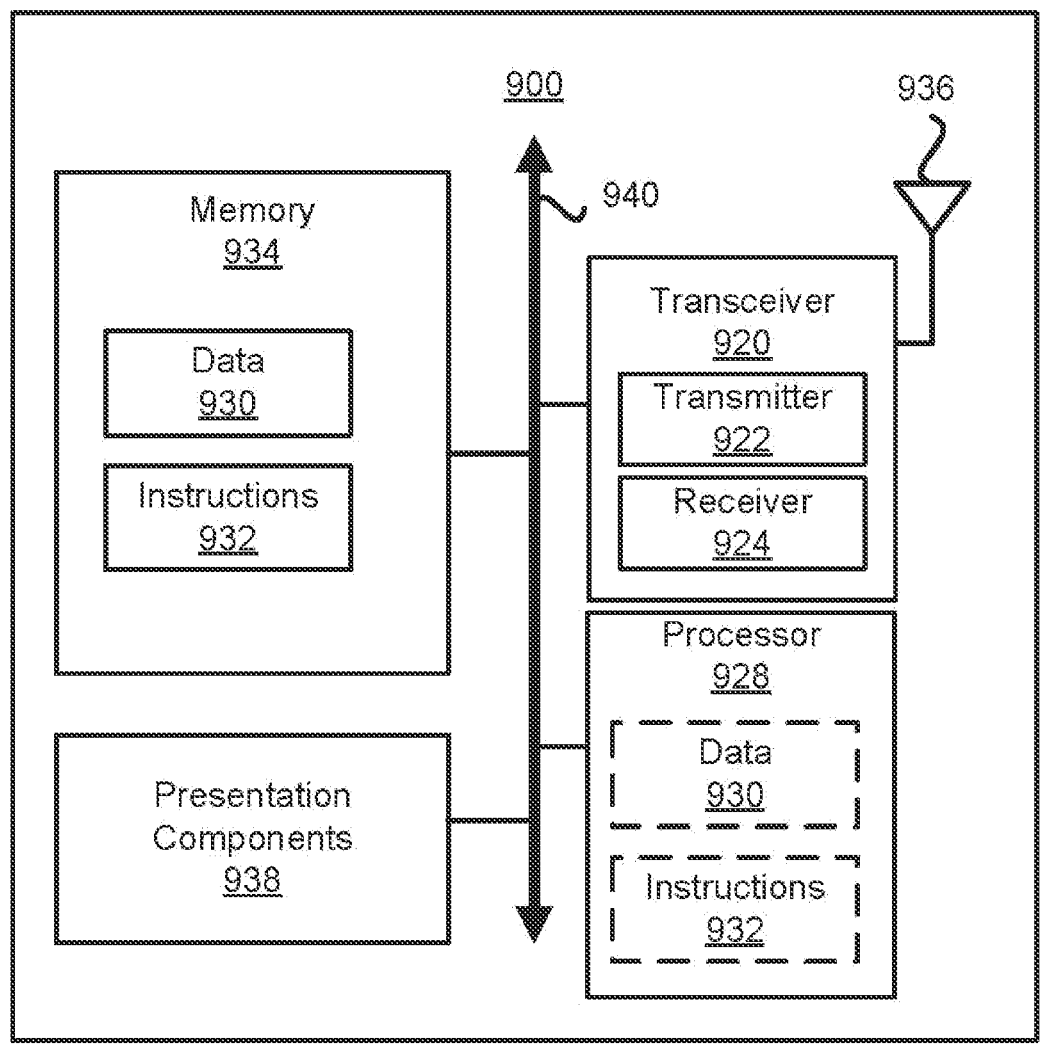
FIG. 9 is a block diagram illustrating a node for wireless communication according to various aspects of the present application.

FIG. 9 is a block diagram illustrating a node for wireless communication, in accordance with various aspects of the present application. As shown in FIG. 9, a node 900 may include a transceiver 920, a processor 928, a memory 934, one or more presentation components 938, and at least one antenna 936. The node 900 may also include an RF spectrum band module, a BS communications module, a network communications module, and a system communications management module, Input/Output (I/O) ports, I/O components, and power supply (not explicitly shown in FIG. 9). Each of these components may be in communication with each other, directly or indirectly, over one or more buses 940. In one implementation, the node 900 may be a UE or a BS that performs various functions described herein, for example, with reference to FIGS. 1 through 8.

The transceiver 920 having a transmitter 922 (e.g., transmitting/transmission circuitry) and a receiver 924 (e.g., receiving/reception circuitry) may be configured to transmit and/or receive time and/or frequency resource partitioning information. In some implementations, the transceiver 920 may be configured to transmit in different types of subframes and slots including, but not limited to, usable, non-usable and flexibly usable subframes and slot formats. The transceiver 920 may be configured to receive data and control channels.

The node 900 may include a variety of computer-readable media. Computer-readable media may be any available media that may be accessed by the node 900 and include both volatile (and non-volatile media) and removable (and non-removable) media. By way of example, and not limitation, computer-readable media may comprise computer storage media and communication media. Computer storage media may include both volatile (and/or non-volatile), as well as removable (and/or non-removable) media implemented in any method or technology for storage of information such as computer-readable instructions, data structures, program modules or data.

Computer storage media includes RAM, ROM, EEPROM, flash memory or other memory technology, CD-ROM, Digital Versatile Disks (DVD) or other optical disk storage, magnetic cassettes, magnetic tape, magnetic disk storage or other magnetic storage devices. Computer storage media does not comprise a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of any of the above should also be included within the scope of computer-readable media.

The memory 934 may include computer-storage media in the form of volatile and/or non-volatile memory. The memory 934 may be removable, non-removable, or a combination thereof. Example memory includes solid-state memory, hard drives, optical-disc drives, etc. As illustrated in FIG. 9, the memory 934 may store computer-readable and computer-executable instructions 932 (e.g., software codes) that are configured to, when executed, cause the processor 928 to perform various functions described herein, for example, with reference to FIGS. 1 through 8. Alternatively, the instructions 932 may not be directly executable by the processor 928 but be configured to cause the node 900 (e.g., when compiled and executed) to perform various functions described herein.

The processor 928 (e.g., having processing circuitry) may include an intelligent hardware device, e.g., a Central Processing Unit (CPU), a microcontroller, an ASIC, etc. The processor 928 may include memory. The processor 928 may process the data 930 and the instructions 932 received from the memory 934, and information through the transceiver 920, the base band communications module, and/or the network communications module. The processor 928 may also process information to be sent to the transceiver 920 for transmission through the antenna 936, to the network communications module for transmission to a core network.

One or more presentation components 938 presents data indications to a person or other device. Examples of presentation components 938 may include a display device, speaker, printing component, vibrating component, etc.

From the above description, it is manifested that various techniques may be used for implementing the concepts described in the present application without departing from the scope of those concepts. Moreover, while the concepts have been described with specific reference to certain implementations, a person of ordinary skill in the art may recognize that changes may be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A user equipment (UE), comprising:
   one or more non-transitory computer-readable media having computer-executable instructions embodied thereon; and
   at least one processor coupled to the one or more non-transitory computer-readable media, the at least one processor being configured to execute the computer-executable instructions to cause the UE to:

receive, from a serving cell, a radio access network (RAN) notification area (RNA) configuration when the UE is in a radio resource control (RRC) inactive (RRC_INACTIVE) state;

transition from the RRC_INACTIVE state to an RRC idle (RRC_IDLE) state when the UE finds and camps on an acceptable cell that fulfills a minimum set of requirements to initiate an emergency call and to receive Earthquake & Tsunami Warning System (ETWS) and Commercial Mobile Alert System (CMAS) notifications, wherein the UE obtains limited service within a coverage area of the acceptable cell, and the serving cell and the acceptable cell are associated with a same core network; and discard the RNA configuration that comprises at least one of a list of tracking area identities (IDs) and a list of RAN area IDs in response to the transitioning from the RRC_INACTIVE state to the RRC_IDLE state.

2. The UE of claim 1, wherein the at least one processor is further configured to execute the computer-executable instructions to cause the UE to:

transition to a first sub-state of the RRC_INACTIVE state when the UE does not find any suitable cell during a cell reselection evaluation process; and attempt to find a suitable cell that is configured in the RNA configuration when the UE is in the first sub-state of the RRC_INACTIVE state.

3. The UE of claim 2, wherein the at least one processor is further configured to execute the computer-executable instructions to cause the UE to:

receive, via one of system information from a camped cell and dedicated signaling of the serving cell, a priority order used in the cell reselection evaluation process.

4. The UE of claim 3, wherein the at least one processor is further configured to execute the computer-executable instructions to cause the UE to:

ignore the priority order when a timer expires.

5. The UE of claim 2, wherein the at least one processor is further configured to execute the computer-executable instructions to cause the UE to:

transition to a second sub-state of the RRC_INACTIVE state when the UE finds a suitable cell that is configured in the RNA configuration; and trigger an RNA update procedure.

6. The UE of claim 2, wherein the at least one processor is further configured to execute the computer-executable instructions to cause the UE to:

receive, from the serving cell, a periodic RNA update timer; and stay in the first sub-state of the RRC_INACTIVE state when the UE is in the first sub-state of the RRC_INACTIVE state and the periodic RNA update timer expires.

7. The UE of claim 2, wherein the at least one processor is further configured to execute the computer-executable instructions to cause the UE to:

receive, from the serving cell, a periodic RNA update timer; and restart the periodic RNA update timer when the UE is in the first sub-state of the RRC_INACTIVE state and the periodic RNA update timer expires.

8. The UE of claim 2, wherein the at least one processor is further configured to execute the computer-executable instructions to cause the UE to:

receive, from the serving cell, a periodic RNA update timer;

pause the periodic RNA update timer when the UE transitions to the first sub-state of the RRC_INACTIVE state; and resume the periodic RNA update timer when the UE leaves the first sub-state of the RRC_INACTIVE state.

9. The UE of claim 1, wherein the at least one processor is further configured to execute the computer-executable instructions to cause the UE to:

receive a paging message from a suitable cell, wherein the paging message comprises a paging record, and the paging record comprises a UE identity; and initiate an RRC connection resumption procedure when the UE identity in the paging record matches an inactive radio network temporary identifier (I-RNTI) stored in the UE.

10. The UE of claim 1, wherein the at least one processor is further configured to execute the computer-executable instructions to cause the UE to:

receive public land mobile network (PLMN) information from a camped cell, wherein the PLMN information comprises a PLMN identity that is configured in the RNA configuration;

report, by an access stratum (AS) layer of the UE, the PLMN identity to a non-access stratum (NAS) layer of the UE; and perform a PLMN selection procedure.

11. A method performed by a user equipment (UE), the method comprising:

receiving, from a serving cell, a radio access network (RAN) notification area (RNA) configuration when the UE is in a radio resource control (RRC) inactive (RRC_INACTIVE) state;

transitioning from the RRC_INACTIVE state to an RRC idle (RRC_IDLE) state when the UE finds and camps on an acceptable cell that fulfills a minimum set of requirements to initiate an emergency call and to receive Earthquake & Tsunami Warning System (ETWS) and Commercial Mobile Alert System (CMAS) notifications, wherein the UE obtains limited service within a coverage area of the acceptable cell, and the serving cell and the acceptable cell are associated with a same core network; and discarding the RNA configuration that comprises at least one of a list of tracking area identities (IDs) and a list of RAN area IDs in response to the transitioning from the RRC_INACTIVE state to the RRC_IDLE state.

12. The method of claim 11, further comprising:

transitioning to a first sub-state of the RRC_INACTIVE state when the UE does not find any suitable cell during a cell reselection evaluation process; and attempting to find a suitable cell that is configured in the RNA configuration when the UE is in the first sub-state of the RRC_INACTIVE state.

13. The method of claim 12, further comprising:

receiving, via one of system information from a camped cell and dedicated signaling of the serving cell, a priority order used in the cell reselection evaluation process.

14. The method of claim 13, further comprising:

ignoring the priority order when a timer expires.

15. The method of claim 12, further comprising:

transitioning to a second sub-state of the RRC_INACTIVE state when the UE finds a suitable cell that is configured in the RNA configuration; and triggering an RNA update procedure.

16. The method of claim 12, further comprising:

receiving, from the serving cell, a periodic RNA update timer; and staying in the first sub-state of the RRC_INACTIVE state when the UE is in the first sub-state of the RRC_INACTIVE state and the periodic RNA update timer expires.

17. The method of claim 12, further comprising:
receiving, from the serving cell, a periodic RNA update timer; and
restarting the periodic RNA update timer when the UE is in the first sub-state of the RRC_INACTIVE state and the periodic RNA update timer expires.

18. The method of claim 12, further comprising:
receiving, from the serving cell, a periodic RNA update timer;
pausing the periodic RNA update timer when the UE transitions to the first sub-state of the RRC_INACTIVE state; and
resuming the periodic RNA update timer when the UE leaves the first sub-state of the RRC_INACTIVE state.

19. The method of claim 11, further comprising:
receiving a paging message from a suitable cell, wherein the paging message comprises a paging record, and the paging record comprises a UE identity; and
initiating an RRC connection resumption procedure when the UE identity in the paging record matches an inactive radio network temporary identifier (I-RNTI) stored in the UE.

20. The method of claim 11, further comprising:
receiving public land mobile network (PLMN) information from a camped cell, wherein the PLMN information comprises a PLMN identity that is configured in the RNA configuration;
reporting, by an access stratum (AS) layer of the UE, the PLMN identity to a non-access stratum (NAS) layer of the UE; and
performing a PLMN selection procedure.

* * * * *